United States Patent
Li et al.

(10) Patent No.: US 8,797,896 B2
(45) Date of Patent: Aug. 5, 2014

(54) SYSTEM AND METHOD FOR ASSIGNING BACKHAUL RESOURCES

(75) Inventors: Zhongfeng Li, Shanghai (CN); Philippe Sartori, Algonquin, IL (US)

(73) Assignee: Futurewei Technologies, Inc., Plano, TX (US)

( * ) Notice: Subject to any disclaimer, the term of this patent is extended or adjusted under 35 U.S.C. 154(b) by 161 days.

(21) Appl. No.: 13/212,559

(22) Filed: Aug. 18, 2011

(65) Prior Publication Data
US 2012/0051277 A1  Mar. 1, 2012

Related U.S. Application Data

(60) Provisional application No. 61/376,998, filed on Aug. 25, 2010.

(51) Int. Cl.
*G08C 15/00* (2006.01)

(52) U.S. Cl.
USPC ........... 370/252; 370/279; 370/280; 370/293; 370/321; 370/326; 370/348; 370/442

(58) Field of Classification Search
USPC ......... 370/276–282, 293–296, 315, 321, 322, 370/326, 347, 348, 442
See application file for complete search history.

(56) References Cited

U.S. PATENT DOCUMENTS

| 8,218,509 | B2 | 7/2012 | McCoy et al. | |
| 2010/0034135 | A1 | 2/2010 | Kim et al. | |
| 2010/0182939 | A1 | 7/2010 | Ojala et al. | |
| 2010/0278082 | A1 | 11/2010 | Dahlman et al. | |
| 2010/0323684 | A1 | 12/2010 | Cai et al. | |
| 2011/0038285 | A1* | 2/2011 | Kwon et al. | 370/281 |
| 2011/0149774 | A1* | 6/2011 | Chen et al. | 370/252 |
| 2012/0044841 | A1* | 2/2012 | Chen et al. | 370/279 |
| 2012/0069795 | A1* | 3/2012 | Chung et al. | 370/315 |
| 2012/0170504 | A1* | 7/2012 | Hoymann et al. | 370/312 |
| 2012/0201229 | A1* | 8/2012 | Feng et al. | 370/336 |
| 2013/0044674 | A1* | 2/2013 | Teyeb et al. | 370/315 |

FOREIGN PATENT DOCUMENTS

| CN | 101577957 | 11/2009 |
| WO | WO 2009/088344 A2 | 7/2009 |
| WO | WO 2010/016693 A2 | 2/2010 |
| WO | WO 2010/032124 A1 | 3/2010 |
| WO | WO 2010/051780 A1 | 5/2010 |

OTHER PUBLICATIONS

"Discussion on Backhaul link of Type-1 Relay for LTE-A TDD," 3GPP TSG-RAN1 Meeting #56BIS, R1-091506, Mar. 23-27, 2009, 5 pages, Seoul, Korea.

(Continued)

*Primary Examiner* — Alvin Zhu
(74) *Attorney, Agent, or Firm* — Slater & Matsil, L.L.P.

(57) ABSTRACT

A method for wireless communication comprises a donor enhanced Node B (eNB) transmitting system information for a subframe structure to a relay node (RN), which information comprises radio resource configuration and/or timing information for uplink backhaul transmission. The RN uses an automatic method to select the Round Trip Time (RTT) value for the Hybrid Automatic Repeat request (HARQ) on the uplink backhaul (Un) relay link. The RTT value is implicitly determined according to the Un (backhaul) subframe or MBSFN subframe configuration periodicity. The RTT option is signaled by the Un subframe configuration period of the MBSFN Un downlink signals.

27 Claims, 8 Drawing Sheets

(56) References Cited

OTHER PUBLICATIONS

"Backhaul Subframe Configuration and HARQ for FDD Type 1 Relay," 3GPP TSG RAN WG1 Meeting #59, R1-094724, Nov. 9-13, 2009, 9 pages, Jeju, Korea.

"Draft Report of 3GPP TSG RAN WG1#59bis v0.1.0," 3GPP TSG RAN WG1 Meeting #60, R1-10xxxx, Feb. 22-26, 2010, 89 pages, San Francisco, U.S.

"UL/DL HARQ timing for backhaul," 3GPP TSG-RAN WG1 Meeting #61, R1-102883, May 10-14, 2010, 4 pages, Montreal, Canada.

"Un Subframe Allocation for FDD," 3GPP TSG RAN WG1 Meeting #61, R1-103122, May 10-14, 2010, 3 pages, Montreal, Canada.

"$3^{rd}$ Generation Partnership Project; Technical Specification Group Radio Access Network; Evolved Universal Terrestrial Radio Access (E-UTRA); Radio Resource Control (RRC); Protocol specification (Release 8)," 3GPP TS 36.331 v8.10.0, Jun. 2010, 211 pages.

International Search Report of the Patent Cooperation Treaty received in International Application No. PCT/CN2011/078686, mailed Dec. 1, 2011, 5 pages.

* cited by examiner

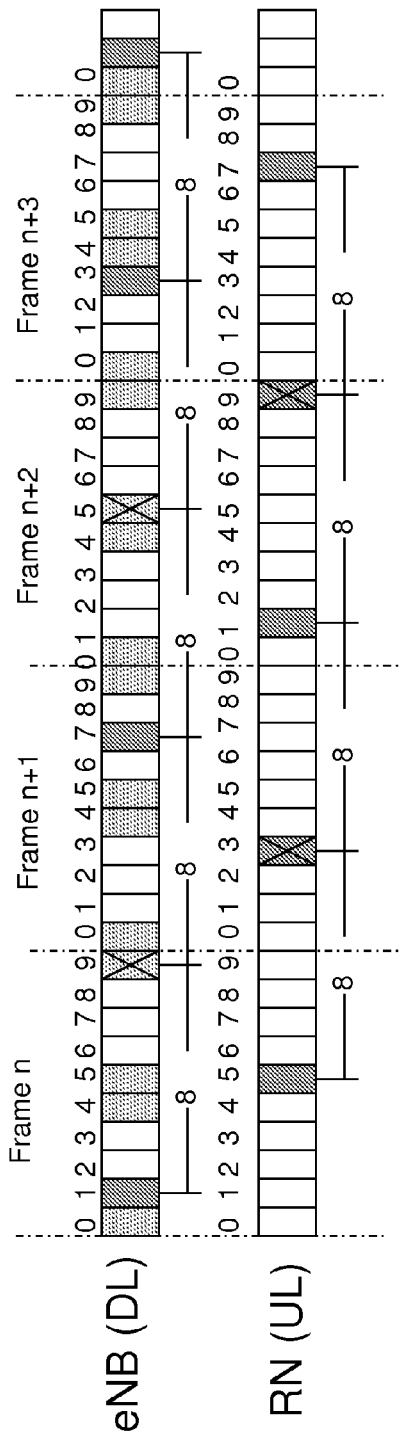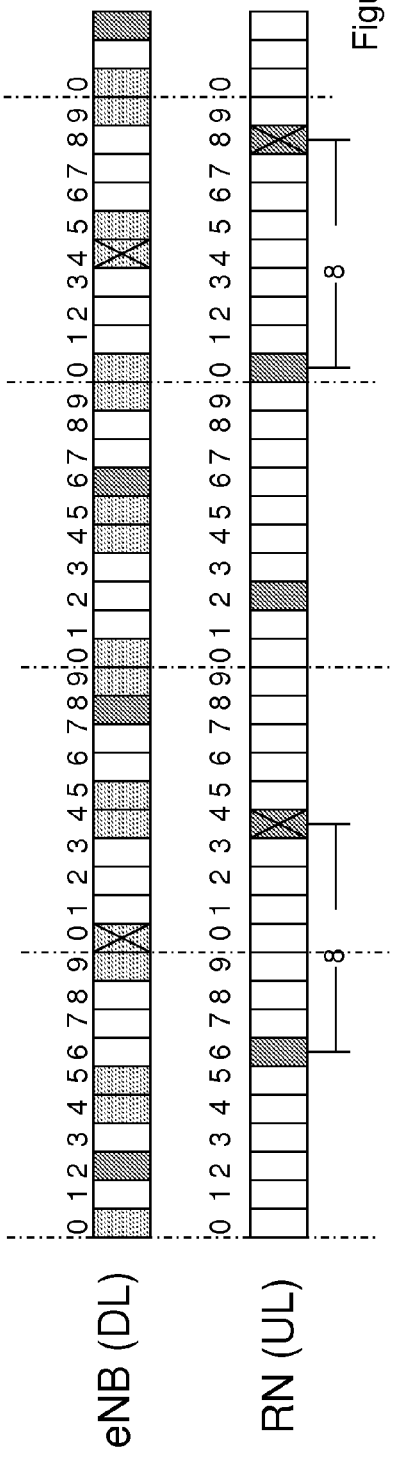

| Patterns for Un subframe configuration | DL subframes within 40ms period | | | |
|---|---|---|---|---|
| | Frame N | Frame N+1 | Frame N+2 | Frame N+3 |
| 1 | 1 | 7 | X | 3 |
| 2 | 2 | 8 | 6 | X |
| 3 | 3 | 1 | 7 | X |
| 4 | X | 2 | 8 | 6 |
| 5 | X | 3 | 1 | 7 |
| 6 | 6 | X | 2 | 8 |
| 7 | 7 | X | 3 | 1 |
| 0 | 8 | 6 | X | 2 |

Figure 5(a)

| 0 | 1 | 2 | 3 | 4 | 5 | 6 | 7 |
|---|---|---|---|---|---|---|---|
| 8 | 1 | 2 | 3 | x2 | x3 | 6 | 7 |

Figure 5(b)

| Patterns for Un subframe configuration | DL subframes within 10ms period |
|---|---|
| | Frame N |
| 1 | 1 |
| 2 | 2 |
| 3 | 3 |
| 4 | 6 |
| 5 | 7 |
| 6 | 8 |

Figure 6(c)

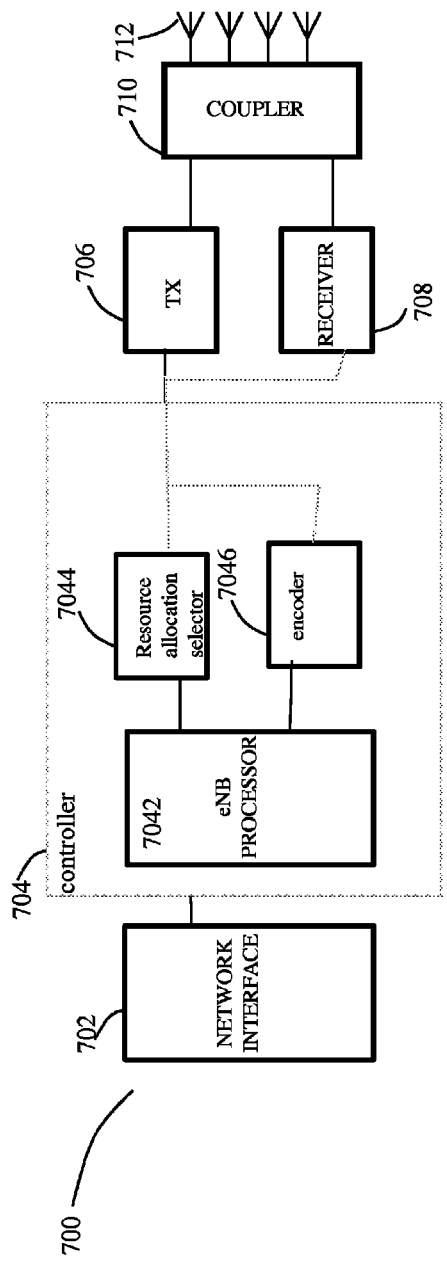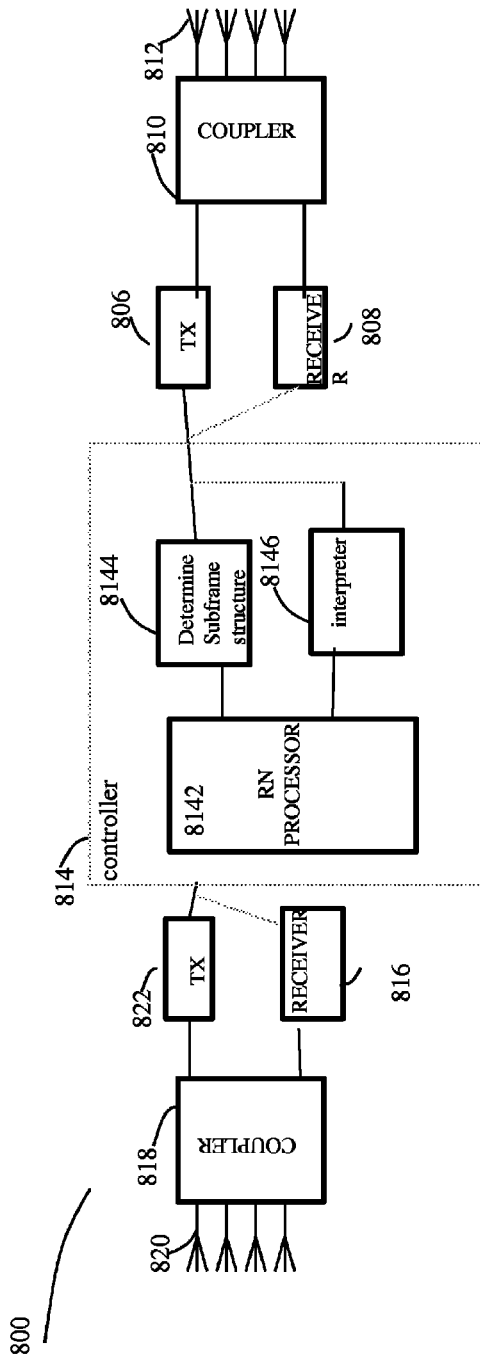

SYSTEM AND METHOD FOR ASSIGNING BACKHAUL RESOURCES

This application claims the benefit of U.S. Provisional Application No. 61/376,998, filed on Aug. 25, 2010, entitled "Automatic Round Trip Value Selection," which application is hereby incorporated herein by reference.

TECHNICAL FIELD

The present invention relates generally to wireless communication, and more particularly to a system and method for assigning backhaul resources such as automatic Round Trip Time (RTT) value for a backhaul (Un) uplink (UL) Hybrid Automatic Repeat request (HARQ) message.

BACKGROUND

Wireless communication systems are widely used to provide voice and data services for multiple users using a variety of access terminals such as cellular telephones, laptop computers and various multimedia devices. Such communications systems can encompass local area networks, cellular telephone and/or mobile broadband networks. The communication system can use one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), Worldwide Interoperability for Microwave Access (WiMAX), Universal Mobile Telecommunications System (UMTS), the 3rd Generation Partnership Project (3GPP), 1X Evolution-Data Optimized EV-DO, or Long Term Evolution (LTE). The LTE radio access technology is based on 3GPP Release 8 (Rel-8). The 3GPP Release 10 (Rel-10) standard, also known as, Long Term Evolution Advanced (LTE-A), further extends the performance and capabilities of the LTE radio access technology. The LTE and LTE-A encompass the evolution of the radio access network through the E-UTRAN (Evolved Universal Terrestrial Radio Access Network).

Relay nodes (RNs) are being standardized for Rel-10 and play a significant role in the LTE-A. RNs can increase coverage and cell edge throughput, and provide group mobility or temporary network deployment. A RN is wirelessly connected to a donor cell, also referred to as a donor enhanced NodeB (eNB or D-eNB), or a base station. The RN may serve as an eNB to one or more User Equipment (UE), or mobile stations, terminals, users, and so forth. The link between a RN and a UE is referred to as an access link or a Uu link, while the link between an eNB and a RN is referred to as a backhaul link or a Un link. To a UE that is being served by a RN, the RN may appear identical to an eNB, with the RN scheduling uplink (UL) and downlink (DL) transmissions to the UE over an access link.

Multicast-Broadcast Single Frequency Network (MBSFN) operation involves simultaneous transmission of the same waveform from multiple cells over a single frequency. MBSFN subframes which were first defined in LTE initially intended for broadcast support. However, given that the control and pilot overhead is lower than on a normal subframe and using MBSFN subframe can keep the backward compatibility with legacy UE, it was later decided that MBSFN subframes may be used by any device, including RN. In particular, it was decided that for RNs, the backhaul link (between the eNB and the RN, also known as Un link) data would be carried on subframes configured as MBSFN subframes in the relay cell. From eNB frame aspect, the Un subframe can be normal subframe or MBSFN subframe which can be left to the implementation. For RN frame aspect, the Un subframe is always configured as MBSFN subframe. The definition of the MBSFN subframe pattern is included in the System Information Block Type 2 (Specified in 3GPP document 36.331, "Radio Resource Control (RRC) Protocol Specification"). The MBSFN subframe pattern can be defined with either a 10-subframe (10 ms) periodicity, or a 40-subframe (40 ms) periodicity.

SUMMARY OF THE INVENTION

These and other problems are generally solved or circumvented, and technical advantages are generally achieved, by embodiments of a system and method for automatic Round Trip Value selection for backhaul communications comprising relay nodes.

The embodiments can be implemented in wireless communications systems using relays, such as a LTE, a LTE-A compliant wireless communications system, or a IEEE802.16m system.

In a LTE-A compliant wireless communications system, MBSFN subframe patterns can be configured with different periods, for instance 10 and 40 ms periods are possible, while the current Hybrid Automatic Repeat request (HARQ) transmission scheme for UEs is largely designed with the intent of an 8 ms periodic operation. Embodiments within the disclosure provide a resource allocation method using the periodicity of both MBSFN subframe allocation and HARQ timing. In particular, it extends the existing resource allocation signaling method between eNB and RN to support a multiple of 10 ms resource allocation in addition to the existing multiple of 8 ms resource allocation without the need to define extra signaling message.

In accordance with an example embodiment, a method for automatic Round Trip Value selection for backhaul communications is provided. The base station determines a first period of a first Multimedia Broadcast Multicast Service over a Single Frequency Network (MBSFN) subframe pattern or Un subframe pattern. The base station further transmits a system configuration information of the first MBSFN subframe pattern or any Un subframe to the RN. A base station may support multiple round trip time (RTT) values for a Hybrid Automatic Repeat request (HARQ) transmission between the base station and a relay node (RN), and may select one or more values of round trip time (RTT) from a plurality of RTT values for the 1st Un subframe/MBSFN subframe patterns.

In accordance with an example embodiment, a relay node (RN) may receive a system configuration information of a first Un subframe pattern with a first period from a base station. The RN then determines one or more values of round trip time (RTT) from among a plurality of RTT values supported by the RN which is related to the first period of the first Un subframe pattern. The RN further sets up a backhaul link with the base station for a HARQ transmission with the first value(s) of RTT.

In accordance with an example embodiment, the first period of the first Un subframe pattern may be a 40 ms Un subframe pattern with a period of 40 ms, and the related first value of RTT for the HARQ transmission between the base station and a relay node can be 8 ms or other values. The HARQ transmission between the base station and a relay node with a RTT value of 8 ms exhibits a period of 40 ms in the transactions, which is the same period of 40 ms for the Un subframe pattern. Alternatively, the first period of the first Un subframe pattern may be a 10 ms Un subframe pattern with a period of 10 ms, and the related first value of RTT is 10 ms.

In accordance with an example embodiment, the HARQ transmission between the base station and the RN has a first delay downlink and a second delay uplink, such that the first delay and the second delay sum to the first value of RTT, and each of the first delay and the second delay is equal to or greater than 4 ms.

In accordance with an example embodiment, the system configuration information of the first Un subframe pattern is a 6-bit bitmap for a 10 ms period Un subframe pattern, or a 24-bit/8-bit bitmap for a 40 ms period Un subframe pattern. Alternatively, the system configuration information of the first Un subframe pattern is a 10-bit bitmap for a 10 ms period Un subframe pattern, or a 40-bit/8-bit bitmap for a 40 ms period Un subframe pattern.

BRIEF DESCRIPTION OF THE DRAWINGS

For a more complete understanding of the embodiments, and the advantages thereof, reference is now made to the following descriptions taken in conjunction with the accompanying drawings, in which:

FIGS. 4(a) and 4(b) are diagrams showing examples of the HARQ transactions with 8 ms RTT time within a 40 ms Un subframe pattern;

FIG. 5(a) is a table showing the HARQ transactions with 8 ms RTT time within a 40 ms Un subframe pattern, and FIG. 5(b) is an example bitmap showing the first subframe allocation;

FIG. 6(c) is a bitmap showing the first subframe allocation; and FIGS. 7 and 8 are diagrams showing embodiments of an eNB node and a RN node.

DETAILED DESCRIPTION OF ILLUSTRATIVE EMBODIMENTS

The making and using of the embodiments are discussed in detail below. It should be appreciated, however, that the present disclosure provides many applicable illustrative concepts that can be embodied in a wide variety of specific contexts. The specific embodiments discussed are merely illustrative of specific ways to make and use the invention, and do not limit the scope of the invention.

Figure 1:
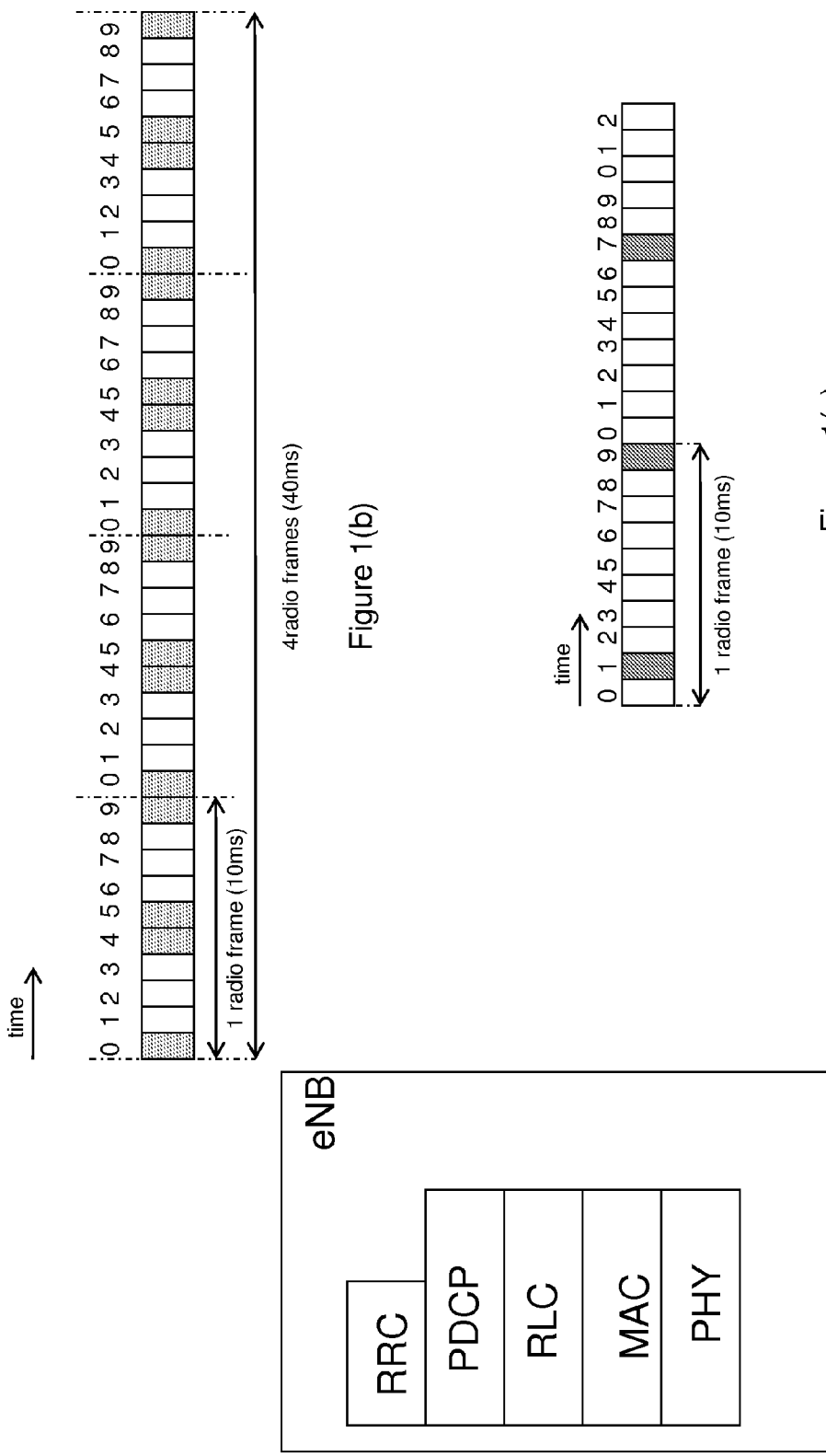
FIGS. 1(a), 1(b), and 1(c) are diagrams of a communications system protocol stack running on an eNB, a frame structure used for Un subframe, and a periodic HARQ transmission.

The embodiments will be described in a specific context, namely a LTE-A compliant wireless communications system, and can be implemented in wireless communications systems using relays. The invention may also be applied, however, to other wireless communications systems that support the use of relay nodes such as IEEE802.16m systems.

eNBs provide the necessary user and control plane protocols for proper functions of a LTE or LTE-A system. FIG. 1(a) illustrates a graphical overview of both protocol stacks. The control plane stack includes the Radio Resource Control (RRC) protocols. In the user plane, the protocols include: the Packet Data Convergence Protocol (PDCP), the Radio Link control (RLC), Medium Access Control (MAC), and Physical Layer (PHY) protocols. At the physical layer, three duplexing modes are supported: full frequency division duplex (FDD), half duplex FDD, and time division duplex (TDD). An LTE compliant radio frame consists of 10 subframes numbered from 0 to 9. Each subframe has a duration of one ms.

For LTE-A, in the control plane, the eNB sends Un resource allocation information using a System Information Block (SIB) or RRC information elements to indicate the Un subframe configuration. RRC also carries out functions such as broadcast system information, and radio configuration control.

MBSFN subframe patterns can be configured with different periods, for instance 10 and 40 ms periods are possible. Moreover, in FDD mode, the relay backhaul downlink subframe 0, 4, 5, and 9 cannot be used for MBSFN backhaul downlink subframes. Similarly, in a TDD mode, only subframe numbers, 3, 4, 7, 8, 9 can be configured as MBSFN subframe for backhaul downlink transmission. FIG. 1(b) illustrates four frames in FDD mode which may be one period of Un subframe patterns if the Un subframe has a period of 40 ms, or may be four periods of Un subframe patterns if the Un subframe has a period of 10 ms. Furthermore, subframes 0, 4, 5, and 9 of each frame are blocked out and cannot be configured as MBSFN subframe by the RN.

A MAC layer function includes the Hybrid ARQ (HARQ), which is a combination of Forward Error Correction (FEC) and the retransmission mechanism Automatic Repeat reQuest (ARQ). The HARQ in LTE is an N-process Stop-And-Wait method HARQ with asynchronous re-transmissions in the downlink and synchronous re-transmissions in the uplink. Synchronous HARQ means that the re-transmissions of HARQ blocks occur at predefined periodic intervals. Hence, no explicit signaling is required to indicate to the receiver the retransmission schedule. In an FDD system, the LTE HARQ transmission scheme for UEs is to a large extent designed with the intent of an 8 ms (8 subframes) periodic operation. FIG. 1(c) shows an illustrative example of HARQ transmission with 8 ms periodicity, where the HARQ retransmissions are always performed an integer multiple of 8 ms after the original transmission. The shaded subframes indicate which subframe are allocated to a particular HARQ process. Therefore a total round trip time (RTT) for a HARQ process is 8 ms if HARQ transmission has 8 ms period when no subframe collision happens. The HARQ and resource allocation for RNs is based on the same principles, but takes into account that the non-MBSFN subframes cannot be allocated for the Un link. The HARQ and resource allocation for RNs will be described later.

While HARQ timing being a multiple of 8 ms is beneficial for data transmission, there are cases where supporting multiple of 10 ms can be preferred. Such cases include real time transmission, such as voice or video. A typical data frame form video and/or audio/speech encoder is typically 10 ms. Therefore, there is a need for supporting multiple of 10 ms HARQ process, and corresponding resource allocation, with 10 ms periodicity. As stated above, Un subframe patterns can be configured with different periods, for instance 10 and 40 ms periods are possible. A method to determine resource allocation and/or HARQ periodicity by tying it with the MBSNF or Un allocation message periodicity will be described further herein. Such a method presents the advantage of not having to define new signaling messages.

Figure 2:
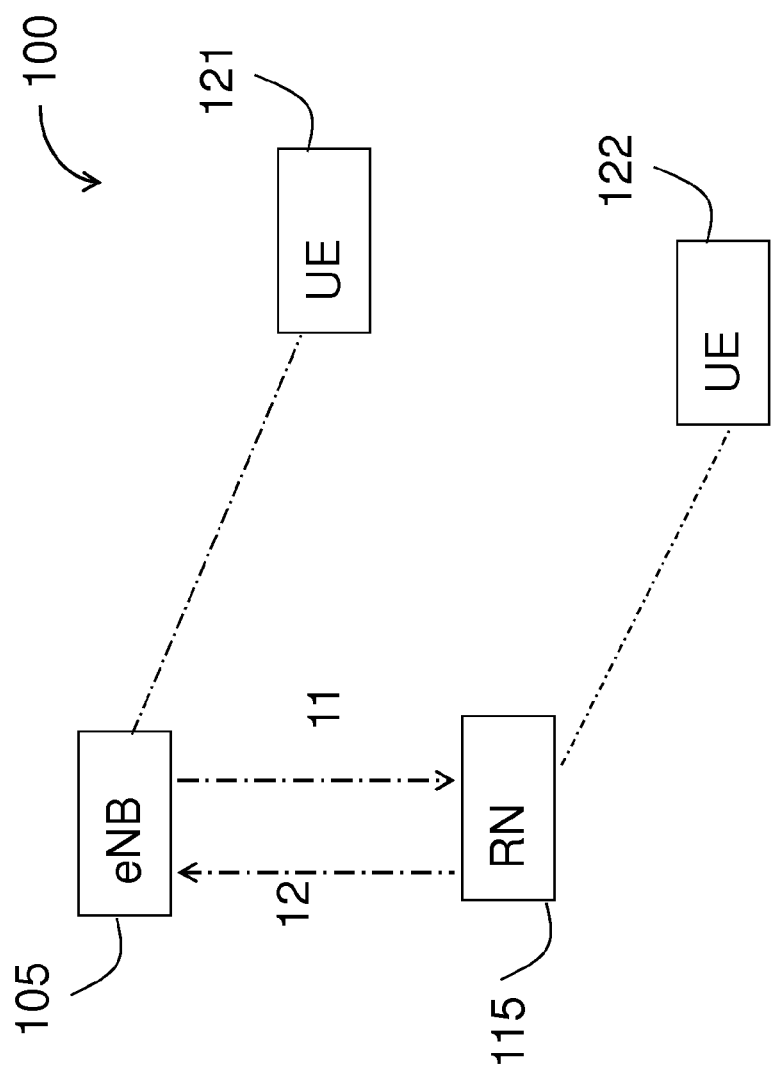
FIG. 2 is a diagram of a 3GPP LTE-A compliant wireless communications system.

FIG. 2 illustrates a communications system 100. Communications system 100 includes an eNB 105 and a RN 115. A RN may be used to improve data transfer rates, mobility, coverage, throughput, and so forth. Communications system 100 also includes one or more UEs, such as UE 121 and UE 122. As an example, UE 122 represents a UE that is served by a RN (RN 115) while UE 121 represents a UE that is served directly by the donor eNB (eNB 105). An eNB can simultaneously serve RN(s) and its own UEs, and a RN can serve several UEs. Communications from eNB 105 to RN 115 and eNB to UE 121 may be time and/or frequency multiplexed together. To the UE served by a RN, an eNB or a RN may be functionally equivalent.

A RN is connected to an eNB, with either a wired or a wireless connection. The wireless connection may use a different frequency carrier than the connections with the UE (outband relaying), or may be multiplexed on the same frequency carrier as UEs (inband relaying). While the invention focuses on inband relaying, it can also be extended to outband relaying, or even wired backhaul, with none or little straightforward modification.

RN 115 is connected to eNB 105 through a wireless connection between eNB 105 and RN 115, which may be referred to as a backhaul. The eNB 105 is the donor eNB of RN 115. The link 11 from eNB 105 to RN 115 is the backhaul (Un) downlink (DL), and the link 12 from RN 115 to eNB 105 is the backhaul (Un) uplink (UL). The backhaul links 11 and 12 between the eNB and the RN can operate in a frequency division duplex (FDD) mode or a time division duplex (TDD) mode. In the FDD mode, uplink 12 and downlink 11 are divided by a frequency resource. A backhaul downlink 11 is active when transmission is performed on the backhaul link by using a downlink frequency band, and a backhaul uplink 12 is active when transmission is performed on the backhaul link by using an uplink frequency band.

Multiple RNs may possibly be planted in a coverage area of the same donor eNB to cover its cell edge. For example, the RN node 115 may be one of a plurality of similar RNs connected to the eNB 105 (not shown). Furthermore, a wide variety of RNs may be used, including smart repeaters, different types of layer 2 (L2) RNs such as decode-and-forward, and layer 3 (L3) RNs. A RN can be further classified by their IDs. A Type I RN has its own physical cell ID (defined in LTE Rel-8) and transmits its own synchronization channels and reference symbols. A Type 1 RN is compatible with previous Rel-8 UEs. A type II RN should not have a separate cell ID and thus would not create any new cell(s).

The communication in the backhaul between the eNB and RNs is defined by the protocol stacks shown in FIG. 1(a) for the eNB. As stated earlier, Un subframe patterns can be configured with different periods, such as 10 ms or 40 ms. One aspect of an embodiment is to support different options of RTT values, i.e., periods, for HARQ protocol, with implicit signaling from the eNB of which option to choose, saving any extra explicit signaling. Another aspect of an embodiment is to support different subframe resource allocation, especially when subframe resource allocation is tied with a RTT value, as is the case in the current LTE-A specification. Note however that while the subframe resource allocation is linked to a given RTT value, it does not mean that the RTT value used for the subframe resource allocation is the RTT value used for the HARQ timing. In practice, these two values are often different when a multiple of 8 ms HARQ RTT value is used, as currently defined in the LTE-A specification, and the HARQ RTT value may vary (e.g., it can be 10 ms for a first transmission, then 12 ms for a subsequent retransmission).

In one embodiment, the options of RTT values can be either a multiple of 8 ms or a multiple of 10 ms for resource allocation. The RTT option is signaled by the Un subframe configuration period. Briefly, a multiple of 10 ms RTT value corresponds to a 10 ms Un subframe allocation which may be indicated by a 10-bit/6-bit bitmap, and a multiple of 8 ms RTT (or variable) value corresponds to a 40 ms Un subframe pattern allocation which may be indicated by a 24-bit/8-bit bitmap, therefore no explicit extra signaling is needed. The Un subframe configuration period indicates whether the subframe allocated is linked to a multiple of 10 ms RTT value (if the Un periodicity is 10 ms), or a multiple of 8 ms RTT value (if the Un periodicity is 40 ms). The savings of explicit extra signaling is possible because there is an implied relationship between the RTT of HARQ protocol and the period of Un subframe.

Note that the Un subframe allocation type may be tied up to another message. For instance, the Un subframe allocation message may be with a first periodicity, but the resource allocation type may be tied up with the MBSNF subframe allocation periodicity, which can be 10 ms or 40 ms.

Figure 3B:
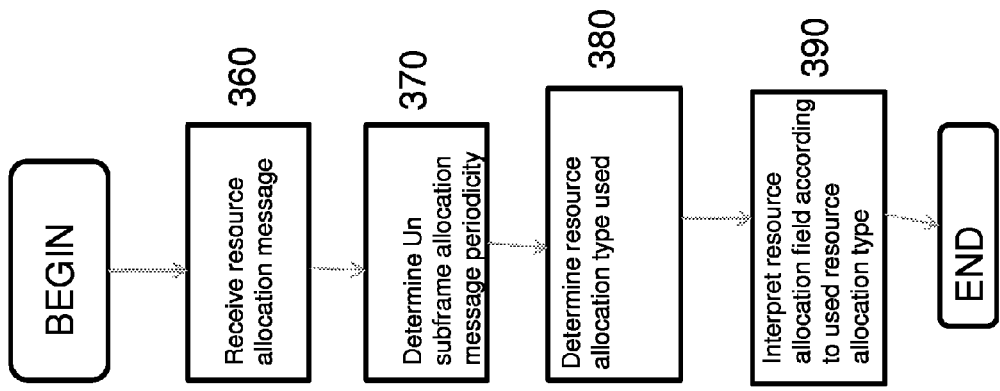
FIGS. 3(a) and 3(b) are diagrams showing the operations of an embodiment.
Figure 3A:
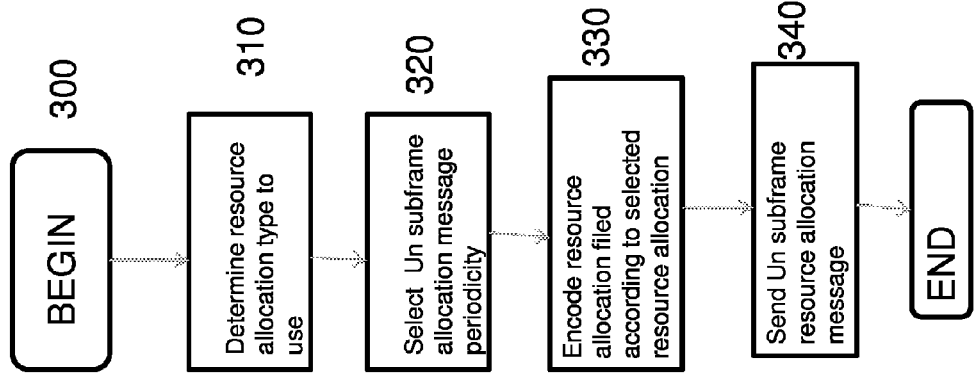

FIG. 3(a) illustrates an exemplary sequence of operations at an eNB. The logic starts at step 310, where the eNB decides which resource allocation type to use for the RN link. The resource allocation type could be based on a multiple of 8 ms RTT value, in order to minimize the latency, for e.g., data transmission related to file transfer, internet web browsing, and so forth, whereas an allocation based on multiple of 10 ms RTT value could be used, for a video codec generating video frames of 20 ms length. Once the resource allocation type has been chosen, the eNB proceeds to step 320 to select a periodicity for the Un subframe allocation message (e.g., MBSFN). For instance, the eNB may elect to choose a 10 ms period if the RTT value is a multiple of 10 ms, or a 40 ms period if the RTT value is a multiple of 8 ms. While describing for the Un subframe allocation message period, MBSFN message is used as illustrative example. A similar process could be used of any message at least partially linked to the Un subframe allocation. The eNB then proceeds to step 330 to encode the resource allocation field of the Un subframe message. The resource allocation field indicates which subframes are allocated for the Un link. The resource allocation field typically consists of a bitmap indicating the first occupied subframe in the resource allocation period. The meaning of the bitmap is typically dependent on the resource allocation type use. For instance, the bitmap may consist of six bits for a multiple of 10 ms RTT value allocation, and of eight bits for a multiple of 8 ms RTT value. After having encoding the message, the eNB then sends the Un resource allocation message (or any other message containing the Un subframe allocation) to the RN at step 340.

The operation of RN 115 is shown in FIG. 3(b). The logic starts at step 360 where the RN receives the Un resource allocation message (e.g., MBSFN). At step 370, the RN determines the Un subframe allocation periodicity. The periodicity may be 10 ms of 40 ms in the current Rel-10 specification. Based on the Un resource allocation message periodicity, the RN determines which resource allocation type is used at step 380. For instance, if the periodicity is 40 ms, the RN may interpret this as meaning that the set of RTT values used for the resource allocation are multiple of 8 ms. The RN then interprets the resource allocation field according to the resource allocation type used at step 390.

In more detail, when the eNB selects the Un subframe configuration periodicity, if the SIB is a bitmap of 24 bits to indicate a 40 ms periodicity for the Un subframe configuration, 8 or 16 ms is selected. If the SIB is a bitmap of 6 bits to indicate a 10 ms periodicity MBSFN/subframe allocation, 10 ms is selected. The set of RTT value shall remain unchanged until a new Un subframe allocation SIB message is received.

Normally, for 10 ms, this bitmap needs 10 bits for a periodicity of 10 ms, and 40 bits for a periodicity of 40 ms. The bitmap is less than the total number of available subframes because the MBSFN subframes cannot be located in subframes 0, 4, 5, 9, so only 6 subframes are available per radio frame (10 ms). If there are no restrictions on the UL allocation, this bitmap has to be 40 bits or 10 bits. Alternative RTT values could be multiple of 8 ms, or multiple of 10 ms, or any multiple of a fixed delay such as 20 ms.

When the RN receives the system information (step 320), it derives the implied RTT value from the received Un subframe configuration bitmap, and determines the subframe structure to be used for the uplink and/or downlink communication.

In more detail, the RN receives a SIB for Un subframe allocation message. If the SIB is a bitmap of 24/8 bits implying a 40 ms period for Un subframe configuration, the RN uses 8 ms or 16 ms or other values (variable RTT) for HARQ protocol RTT value. If the SIB is a bitmap of 6 bits indicating the 10 ms period for Un subframe configuration, the RN uses 10 ms for HARQ protocol RTT value. The RN uses this derived RTT option until a new Un subframe configuration message is received.

In FIG. 4(*a*), an exemplary Un subframe allocation process is shown for a RTT set of values of multiple of 8 ms. The upper part of the figure shows where the eNB transmits, and the RN listens (DL Un subframes), and the lower part shows where the RN transmits and the eNB listens (UL Un subframes). An eNB transmits to a RN a grant valid for a set of four radio frames (40 subframes). Allocated subframes are shown as blackened in FIG. 4(*a*), while subframes 0, 4, 5, and 9 of each RN frame are marked to show that they cannot be used for downlink transmission. Blank subframes are not allocated to the considered RN, but may be allocated to other RN(s) or UE(s). In response to the grant, the RN transmits data to the eNB at subframe 5 of the first frame, shown as the blacked cell 5 at the bottom row of FIG. 4(*a*). The timing between uplink grant and data transmission is fixed to 4 ms, which is represented by 4 subframes. After receiving the first transmission from the RN, the second eNB transmission should occur 8 subframes after the first one, which would correspond to subframe 9. However, subframe 9 cannot be used as MBSFN backhaul downlink, therefore no transmission happens at subframe 9, and subframe 9 of the first frame is marked by a cross sign. The corresponding UL subframe, which should be subframe #3 of frame n+1 (4 ms after the corresponding DL subframe) cannot be used. Since the RTT value is 8, the next DL subframe is subframe 7 of the second frame (9+8 mod 10). The RN transmits after 4 ms at subframe 1 of the third frame. The next DL subframe should be subframe 5 of the third frame, which is blocked and marked by a cross sign in FIG. 4(*a*), and the corresponding UL subframe (9 of the third subframe) is blocked as well. The next available DL subframe is subframe 3 of the fourth frame (allowed). The RN transmits at subframe 7 of the fourth frame, after which the eNB transmits at subframe 1 of the fifth frame, assuming that no new Un subframe allocation message has been received.

The above transaction sequence shown in FIG. 4(*a*) demonstrates that when the RTT value is 8 ms, if the first transmission from an eNB to a RN starts at subframe 1 of the first frame, the eNB will transmit again at subframe 7 of the second frame, no transmission from the eNB to the RN at the third frame, and the eNB transmits again at subframe 3 of the fourth frame (a total of 3 subframes over the 40 ms period). Finally, the eNB transmits at subframe 1 of the fifth frame, which will leads to the same sequence for the frames from frame four to frame seven, and so on. Therefore the transaction sequence for HARQ has a period of 40 ms when the RTT value is multiple of 8 ms.

A similar transaction pattern of the HARQ protocol exhibits when the starting transmission subframe is other subframes of the first frame. In FIG. 4(*b*), at the first DL allocated subframe is subframe 2 of the first frame, shown in FIG. 4(*b*) as the blacked cell 2 in the top row, instead of subframe 1 of the first frame shown in FIG. 4(*a*). In response to the first grant, the RN transmits first data to the eNB at subframe 6 of the first frame, shown as the blacked cell 6 at the bottom row of FIG. 4(*b*). The timing between uplink grant and data transmission is fixed to 4 ms, which is represented by 4 subframes. The next DL subframe would be subframe 0 of frame 2, which cannot be used since it is not a MBSFN subframe, so it is skipped and the next DL subframe is subframe 8 of frame 2. The next one is 8 ms later, subframe 6 of frame 3. The last possible DL subframe in the 40 ms period is 8 ms later, and would be subframe 4 of frame 4, but is skipped since it is non MBSFN. The corresponding allocated UL subframes (4 ms after the DL subframes) are subframes 2 of frame 3, and subframe 0 of frame 4.

Both the resource allocation patterns (referred to as transaction patterns) of the HARQ shown in FIGS. 4(*a*) and 4(*b*) are part of the possible transaction patterns presented in the table in FIG. 5(*a*). Any resource allocation on the DL for a multiple of 8 ms resource allocation can be represented by a combination of 8 transaction patterns. In FIG. 5, the table shows the 8 total possible transaction sequences if RTT value is set to 8 ms implied by the 40 ms MBSFN period. The number in the column labeled as Frame N shows the subframe number of the first frame to be used to transmit the first message from the eNB to the RN. For example, in the first row, the number 1 in the Frame N column indicates that subframe 1 of the first frame is used to transmit the first message from the eNB to the RN, which is the case shown in FIG. 4(*a*). The number in the column labeled by Frame N+1 is the subframe number within the second frame when the eNB transmits to the RN. For example, in the first row, the number 7 in the Frame N+1 column indicates that subframe 7 of the second frame is used to transmit a message from the eNB to the RN, which is the case shown in FIG. 4(*a*). The number in the column labeled by Frame N+2 is the subframe number within the third frame when the eNB transmits to the RN. For example, in the first row, the mark X in the Frame N+2 column indicates that the there is no subframe in the third frame which is used to transmit a message from the eNB to the RN, which is the case shown in FIG. 4(*a*). Finally, the number in the column labeled by Frame N+3 is the subframe number within the fourth frame when the eNB transmits to the RN. For example, in the first row, the mark 3 in the Frame N+3 column indicates that subframe 3 of the fourth frame is used to transmit a message from the eNB to the RN, which is the case shown in FIG. 4(*a*). After the 4 frames, the same pattern allocation is used, unless a new resource allocation message has been received. The Un UL subframe allocation is obtained by shifting the Un DL subframe allocation pattern by 4 subframes.

These 8 patterns are all the possible patterns of transactions from the eNB to the RN when the RTT value is set to 8 ms. Each of the above 8 patterns share a same periodicity of 40 ms since each pattern repeats itself after 4 frames of 40 ms. The bitmap field mentioned in step 330 is 8 bits, as shown in FIG. 5(*b*), with each bit indicating if a given transaction pattern is allocated for the Un DL.

Figure 6A:
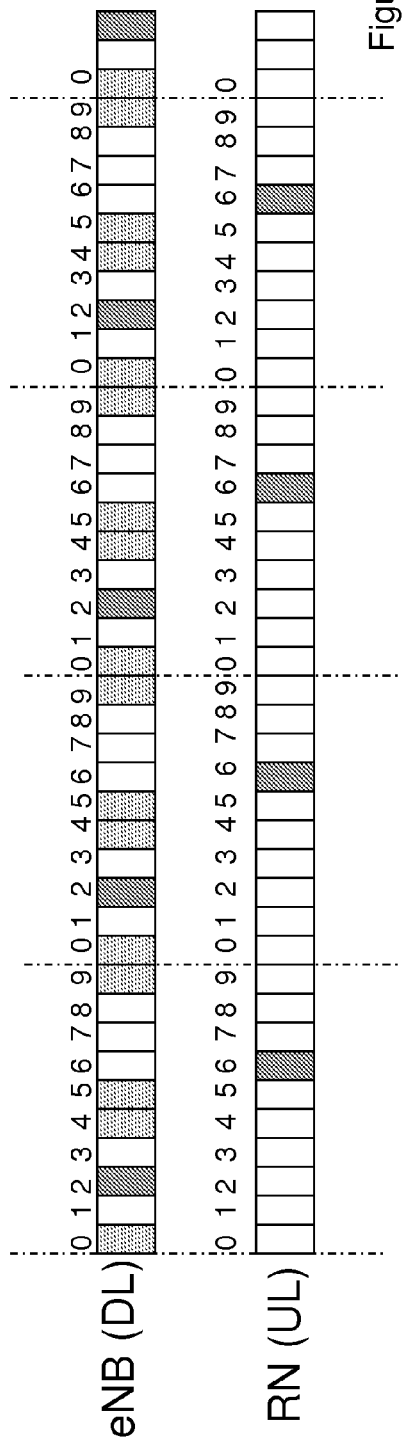
FIGS. 6(a) and 6(b) are diagrams showing examples of the HARQ transactions with 10 ms RTT time within a 10 ms Un subframe pattern.
Figure 6B:
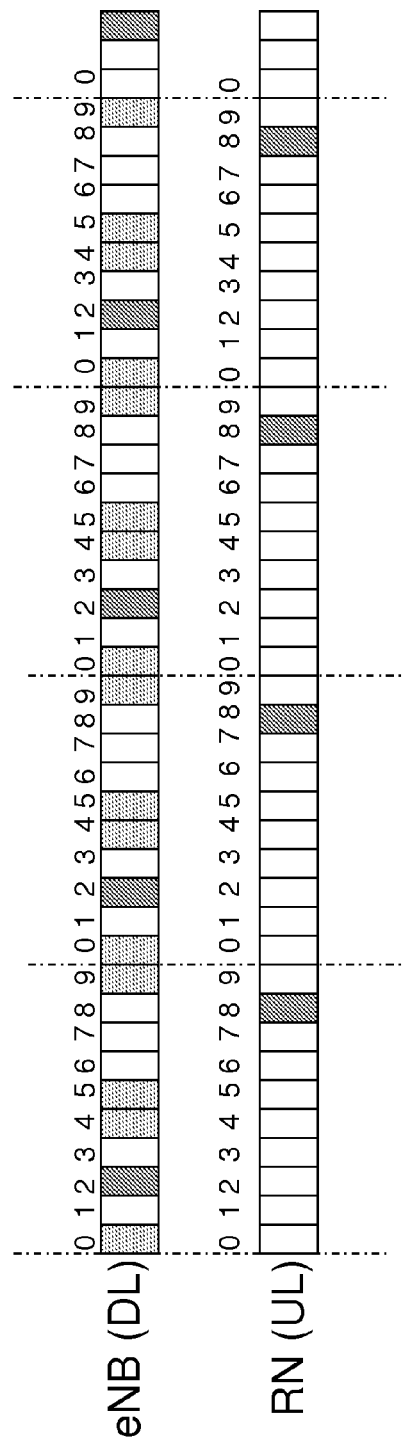

The resource allocation process for a resource allocation linked to a multiple of 10 ms RTT value is similar, and is described in FIG. 6. The transaction pattern between the eNB and the RN is much simpler. The eNB transmits the first message at a subframe number x of the first frame. The RN then transmits on the corresponding Un UL subframe, t1 subframes later. In theory, the RN could wait for a fixed t1 subframe, where t1 is bigger than or equal to 4, to transmit its message. The eNB then could wait for a fixed t2 subframe to transmit its message, where t2 is bigger than or equal to 4. Moreover, the condition t1+t2=10 should be satisfied since the overall RTT value is 10. Therefore there could be three cases for the t1 and t2: t1=4 and t2=6, t1=t2=5, or t1=6 and t2=4. The t1=4 and t2=6 case is shown in FIG. 6(a) while the t1=6 and t2=4 case is shown in FIG. 6(b). However, in practice, it is much better to use t1=4 and t2=6 since this simplifies the resource allocation process and minimizes the chances of blocking.

In FIG. 6(a), the eNB starts to transmit at subframe 2 of the first frame, the RN transmits at subframe 6, which is t1=4 subframe after. The eNB transmits again at subframe 2 of the second frame (due to the 10 ms periodicity of the resource allocation), which is 6 subframes after the RN transmission. Based on the same principles as of for a set of RTT values being multiple of 8 ms, the resource allocation can be described with transaction pattern. In FIG. 6(b), the eNB starts to transmit at subframe 2 of the first frame, the RN transmits at subframe 8, which is t1=6 subframe after. The eNB transmits again at subframe 2 of the second frame (due to the MBSFN period 10), which is 4 subframes after the RN transmission. The above pattern would be true if the eNB starts to transmit at subframes other than subframe 2 of the first frame.

The resource allocation patterns (referred to as transaction patterns) of the HARQ shown in FIG. 6(a) is part of the possible transaction patterns presented in the table in FIG. 6(c) where the t1 is set to 4 subframe for a resource allocation on the DL for a multiple of 10 ms. In FIG. 6(c), the table shows the 6 total possible transaction sequences if RTT value is set to 10 ms implied by the 10 ms MBSFN period and t1 is set to 4. The number in the column labeled as Frame N shows the subframe number of the first frame to be used to transmit the first message from the eNB to the RN. For example, in the second row, the number 1 in the Frame N column indicates that subframe 2 of the first frame is used to transmit the first message from the eNB to the RN, which is the case shown in FIG. 6(a). After the 4 frames, the same pattern allocation is used, unless a new resource allocation message has been received. The Un UL subframe allocation is obtained by shifting the Un DL subframe allocation pattern by 4 subframes. Note that with multiple of 10 ms RTT values, only a six-bit bitmap is needed, whereas for multiple of 8 ms RTT values, an eight-bit bitmap is needed. In practice however, the same bitmap field could be used, with 8 bits, and the last two bits ignored by the RN when receiving a resource allocation for multiple of 10 ms RTT value.

The eNB may be implemented in many ways. A block diagram of an embodiment eNB 700 is illustrated in FIG. 7. eNB 700 has a controller 704 coupled to transmitter (TX) 706 and receiver 708, and network interface 702. Transmitter 706 and receiver 708 are coupled to antenna 712 via coupler 710. The controller 704 executes embodiment methods and algorithms as described above. In more details, the controller 704 may comprise an eNB processor 7042, a resource allocation selector 7044, and an encoder 7046. The resource allocation selector 7044 may select the subframe allocation message period, and the encoder 7046 may encode the selected the resource allocation message to bitmap. Both the resource allocation selector 7044 and the encoder 7046 may be implemented in separate hardware or in software running on the processor 7042. In some applications, the embodiments may be implemented within the transmitter 706, the receiver 708, or as a separate circuitry. Some of the algorithms may also be implemented as software executed using the eNB processor 704. In one or more embodiments, the eNB 700 is configured to transmit system information to a RN. The system information may comprise radio resource configuration and/or timing information for downlink or uplink backhaul relaying.

In an embodiment, eNB 700 is configured to operate in a LTE network using an OFDMA downlink and Discrete Fourier Transform Spread OFDM (DFT-SOFDM) uplink channels. In alternative embodiments, other systems, network types and transmission schemes can be used, for example, 1XEV-DO, IEEE 802.11, IEEE 802.15 and IEEE 802.16. The eNB 700 may have multiple transmitters, receivers and antennas to support MIMO operation.

The RN may be implemented in many ways. A block diagram of an embodiment RN 800 is illustrated in FIG. 8. The RN 800 has donor antenna 820, which transmits to and from the eNB and is coupled to coupler 818, transmitter 822 and receiver 816. Service antenna 812, which transmits to and receives signals from user devices, is coupled to coupler 810, transmitter 806 and receiver 808. A controller 814, which is coupled to both the donor and UE signal paths, controls the operation of relay node and implements embodiment algorithms described herein. The controller 814 may comprise a RN processor, a unit 8144 to determine subframe structure, and an interpreter unit 8146 to interpret resource allocation filed according to used resource allocation type. Either the unit 8144 or 8146 can be implemented in separate hardware or in software running on the processor 8142. The interpret may coordinate MBSFN subframe pattern and Un subframe pattern to include all the possible cases used with MBSFN subframe e.g. Un subframe, unicast transmission, MBMS traffic. In some applications, the embodiments may be implemented within the transmitter 822, the receiver 816, or as a separate circuitry. Some of the algorithms, may also be implemented as software executed using the RN processor 814. In one or more embodiments, the RN 800 is configured to receive system information from a donor base station. The system information may comprise radio resource configuration and/or timing information for downlink or uplink backhaul relaying. The RN 800 uses the system information to set up a subordinate RN for relaying.

In an embodiment, the RN 800 is configured to operate in a LTE network using an OFDMA downlink channels divided into multiple subbands, and Single Carrier Frequency Division Multiple Access (SC-FDMA) uplink divided into multiple subbands. In alternative embodiments, other systems, network types and transmission schemes can be used.

Although the present embodiments and their advantages have been described in detail, it should be understood that various changes, substitutions and alterations can be made herein without departing from the spirit and scope of the embodiments as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of a wireless network communication comprising:
selecting, by a central controller, a resource allocation scheme from a plurality of resource allocation schemes, wherein the resource allocation scheme comprises a first round trip time (RTT) for a hybrid automatic repeat request (HARQ) protocol;
selecting a period of a subframe pattern in accordance with the selected first RTT for the HARQ protocol; and
transmitting, by the central controller, a system configuration information of the subframe pattern to a communication device.

2. The method of claim 1, wherein the period of the subframe pattern is a period of a Multimedia Broadcast Multicast Service over a Single Frequency Network (MBSFN) subframe pattern.

3. The method of claim 1, wherein the subframe pattern comprises either a 10 ms or a 40 ms subframe configuration period.

4. The method of claim 1, wherein the plurality of resource allocation schemes are determined by an available Round Trip Time (RTT) set of the Hybrid Automatic Repeat Request (HARQ) protocol.

5. The method of claim 4, wherein the available RTT set is determined in accordance with a data type.

6. The method of claim 4, wherein the available RTT set comprises a first subset comprising integer multiples of 8 ms and a second subset comprising integer multiples of 10 ms.

7. The method of claim 1 further comprising sending a resource allocation message to the communication device by the central controller.

8. The method of claim 7, wherein the resource allocation message at a first time comprises a first bitmap of a first length for a 10 ms-period subframe pattern.

9. The method of claim 8, wherein the resource allocation message at a second time comprises a second bitmap of a second length for a 40 ms-period subframe pattern, and wherein the first length is different from the second length.

10. The method of claim 9, wherein each bit of the first bitmap and the second bitmap indicates a subframe allocation for a first subframe of a backhaul subframe pattern.

11. The method of claim 8, wherein the first bitmap is coded according to a following table for a 10 ms subframe allocation:

| Bitmap code (bit index) | 0 | 1 | 2 | 3 | 4 | 5 |
|---|---|---|---|---|---|---|
| Corresponding subframe allocation | 1 | 2 | 3 | 6 | 7 | 8 |

12. The method of claim 9, wherein the first length is 6, and the second length is 8.

13. The method of claim 1, wherein the central controller is a base station and the communication device is a relay node.

14. The method of claim 1, wherein the resource allocation scheme is a resource allocation scheme for a backhaul subframe pattern.

15. A method of a wireless network communication comprising:
receiving, by a communication device, a system configuration information of a subframe pattern from a central controller;
determining a period of the subframe pattern in accordance with the system configuration information;
selecting, by the communication device, a resource allocation scheme in accordance with the determined period of the subframe pattern, from a plurality of resource allocation schemes, wherein the resource allocation scheme comprises a first round trip time (RTT) for a hybrid automatic repeat request (HARQ) protocol; and
setting up, by the communication device, a communication between the communication device and the central controller in accordance with the selected resource allocation scheme.

16. The method of claim 15, wherein the period of the subframe pattern is a period of a Multimedia Broadcast Multicast Service over a Single Frequency Network (MBSFN) subframe pattern.

17. The method of claim 15, wherein the subframe pattern comprises either a 10 ms or a 40 ms subframe configuration period.

18. The method of claim 15, wherein the plurality of resource allocation schemes are determined by an available Round Trip Time (RTT) set of the Hybrid Automatic Repeat Request (HARQ) protocol.

19. The method of claim 18, wherein the available RTT set is in accordance with a data type.

20. The method of claim 18, wherein the available RTT set comprises a first subset comprising integer multiples of 8 ms and a second subset comprising integer multiples of 10 ms.

21. The method of claim 15 further comprising receiving a resource allocation message from the central controller by the communication device.

22. The method of claim 21, wherein the resource allocation message at a first time comprises a first bitmap of a first length for a 10 ms-period subframe pattern.

23. The method of claim 22, wherein the resource allocation message at a second time comprises a second bitmap of a second length for a 40 ms-period subframe pattern, and wherein the first length is different from the second length.

24. The method of claim 23, wherein each bit of the first bitmap and the second bitmap indicates a subframe allocation for a first subframe of a backhaul subframe pattern.

25. The method of claim 22, wherein the first bitmap is coded according to a following table for a 10 ms subframe allocation:

| Bitmap code | 0 | 1 | 2 | 3 | 4 | 5 |
|---|---|---|---|---|---|---|
| Corresponding subframe allocation | 1 | 2 | 3 | 6 | 7 | 8 |

26. The method of claim 23, wherein the first length is 6, and the second length is 8.

27. An apparatus for a wireless communication system, comprising:
a resource allocation selector configured to select a resource allocation scheme from a plurality of resource allocation schemes, wherein the resource allocation scheme comprises a first round trip time (RTT) for a hybrid automatic repeat request (HARQ) protocol, and to select a subframe resource allocation message period in accordance with the selected first RTT for the HARQ protocol;

an encoder configured to encode the selected subframe resource allocation message period by a bitmap; and a transmitter configured to transmit the bitmap to a communication device.

* * * * *